United States Patent
Xiao et al.

(10) Patent No.: US 9,686,709 B2
(45) Date of Patent: Jun. 20, 2017

(54) METHOD, APPARATUS AND SYSTEM FOR GUARANTEEING QOS OF COMMUNICATION SERVICE IN NAT SCENARIO

(71) Applicant: Huawei Technologies Co., Ltd., Shenzhen, Guangdong (CN)

(72) Inventors: Lei Xiao, Shenzhen (CN); Qingbin Huang, Shenzhen (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 429 days.

(21) Appl. No.: 14/278,780

(22) Filed: May 15, 2014

(65) Prior Publication Data
US 2014/0247716 A1  Sep. 4, 2014

Related U.S. Application Data

(63) Continuation of application No. PCT/CN2012/084825, filed on Nov. 19, 2012.

(30) Foreign Application Priority Data

Nov. 18, 2011 (CN) .......................... 2011 1 0367615

(51) Int. Cl.
*H04W 28/02* (2009.01)
*H04L 29/06* (2006.01)
*H04L 29/12* (2006.01)

(52) U.S. Cl.
CPC ..... *H04W 28/0205* (2013.01); *H04L 61/2514* (2013.01); *H04L 65/105* (2013.01);
(Continued)

(58) Field of Classification Search
None
See application file for complete search history.

(56) References Cited

U.S. PATENT DOCUMENTS

2008/0091811 A1  4/2008 Wing et al.
2010/0142517 A1*  6/2010 Montemurro ........... H04L 63/20
370/352
(Continued)

FOREIGN PATENT DOCUMENTS

CN   101043475 A   9/2007
CN   101360057 A   2/2009
(Continued)

OTHER PUBLICATIONS

"PacketCable 2.0, NAT and Firewall Traversal Technical Report", Apr. 25, 2008, 26 pages.
(Continued)

*Primary Examiner* — Adnan Baig
(74) *Attorney, Agent, or Firm* — Oblon, McClelland, Maier & Neustadt, L.L.P.

(57) ABSTRACT

A method includes: when a user equipment initiates a communication request, controlling an A-BGF network element to generate proxy SDP information according to calling party SDP information, and replacing the calling party SDP information with the proxy SDP information to establish a connection between the user equipment and a called party; after a connection between both communication parties is successful, instructing a PCRF network element to perform QoS resource reservation; and receiving a NAT-translated-to IP address and a port of the user equipment from the A-BGF network element, and instructing the PCRF network element to update source address information for the QoS resource reservation to the NAT-translated-to IP address and the port of the user equipment. The present invention achieves QoS guarantee of a communication service in a NAT scenario without imposing any special interface requirement on the user equipment.

15 Claims, 6 Drawing Sheets

(52) U.S. Cl.
CPC ...... *H04L 65/1016* (2013.01); *H04L 65/1069* (2013.01); *H04L 65/80* (2013.01); *H04L 61/2564* (2013.01)

(56) References Cited

U.S. PATENT DOCUMENTS

2010/0150134 A1* 6/2010 Qiu .................... H04L 47/781
                                                                370/352
2011/0016499 A1* 1/2011 Liu ..................... H04L 47/801
                                                                 725/98

FOREIGN PATENT DOCUMENTS

| CN | 101867575 A | 10/2010 |
|----|-------------|---------|
| CN | 102387081 A | 3/2012 |
| WO | WO 2010/115466 A1 | 10/2010 |

OTHER PUBLICATIONS

Vikas Bajaj, "IMS Core and Access Integration—Evaluation of Alternative SDO Architectures", Dec. 6, 2007, 5 pages.
"3rd Generation Partnership Project; Technical Specification Group Core Network and Terminals; IP Multimedia Subsystem (IMS) Application Level Gateway (IMS-ALG)—IMS Access Gateway (IMS-AGW interface: Procedures descriptions (Release 10)", 3GPP TS 23.334 V10.2.0., Sep. 2011, 59 pages.
"IP Multimedia Subsystem", Wikipedia, Oct. 24, 2014, 11 pages.
"3rd Generation Partnership Project; Technical Specification Group Services and System Aspects; Policy and charging control architecture (Release 10)", 3GPP TS 23.203 V10.4.0, Jun. 2011, 130 pages.

* cited by examiner

METHOD, APPARATUS AND SYSTEM FOR GUARANTEEING QOS OF COMMUNICATION SERVICE IN NAT SCENARIO

CROSS-REFERENCE TO RELATED APPLICATIONS

This application is a continuation of International Application No. PCT/CN2012/084825, filed on Nov. 19, 2012, which claims priority to Chinese Patent Application No. 201110367615.4, filed on Nov. 18, 2011, both of which are hereby incorporated by reference in their entireties.

TECHNICAL FIELD

The present invention relates to the field of network communications, and in particular, relates to a method, an apparatus, and a system for guaranteeing QoS of a communication service in a NAT scenario.

BACKGROUND

A conventional hybrid fiber-coaxial (hybrid fiber-coaxial, HFC) network provides triple-play services by incorporating an IP multimedia subsystem (IP multimedia subsystem, IMS). In this case, related data (that is, media streams) of a Voice over Internet Protocol (voice over internet protocol, VOIP) service, a video conferencing service, an Internet access service, and an interactive TV service are simultaneously transmitted over a coaxial cable. When network congestion occurs, quality of service (quality of service, QoS) guarantee is required for a communication service that has a high requirement for real-time, such as the VOIP service and the video conferencing service. According to QoS resource reservation, which is one of QoS guarantee mechanisms on the network, a calling party starts to establish a media Packet Data Protocol (packet data protocol, PDP) context on condition that QoS requirements of both parties on media streams and an encoding scheme for media streams are determined, and this process is known as the QoS resource reservation.

For the purpose of saving IP address resources and hiding a network from outside, a large number of network gateways on an existing network provide a network address translation (network address translation, NAT) function. The NAT is a standard method used to map an address domain (for example, a private Intranet) to another address domain (for example, the Internet). An IP address after NAT translation is not fixed, and is randomly assigned by a network gateway. The NAT, however, is merely characterized by address mapping on a network layer. The NAT cannot process an application-layer protocol. Therefore, how to resolve a problem of signaling/media traversal over a private network and further realize QoS guarantee for a communication service in a NAT scenario is now becoming a hot area in the field of telecommunications networks.

On a network where the HFC and IMS are integrated, the prior art, which is based on the PacketCable2.0 standard, uses a STUN server and a TURN server to interwork with a user equipment (user equipment, UE), so as to implement signal traversal and negotiation of an IP address and a port of a media proxy, thereby realizing QoS guarantee. This architecture, however, requires the user equipment to support an X2/X3 interface specially used for interworking with the STUN server and the TURN server. At present, telecommunications devices do not include the user equipment that supports the X2/X3 interface. Therefore, the foregoing solution imposes a high interface requirement on the user equipment, which is adverse to free development of the user equipment.

SUMMARY

An objective of embodiments of the present invention is to provide a method for guaranteeing QoS of a communication service in a NAT scenario, in order to resolve a problem that a conventional architecture imposes a high interface requirement on a user equipment.

In the embodiments of the present invention, a method for guaranteeing QoS of a communication service in a NAT scenario is implemented, where the method is applicable to a P-CSCF network element, and the P-CSCF network element is connected to an A-BGF network element and a PCRF network element, and the method includes:

receiving calling party SDP information sent by a user equipment so that the A-BGF network element generates proxy SDP information according to the calling party SDP information, and replacing the calling party SDP information with the proxy SDP information to establish a connection between the user equipment and a called party, where the calling party SDP information includes a first IP address and a first port of the user equipment, and the proxy SDP information includes a second IP address and a second port of the A-BGF network element;

after the connection between the user equipment and the called party is successfully established, instructing the PCRF network element to perform QoS resource reservation, where source address information required for performing the QoS resource reservation includes the first IP address and the first port, and destination address information required for performing the QoS resource reservation includes the second IP address and the second port; and receiving a third IP address and a third port of the user equipment, where the third IP address and the third port are a result of NAT translation and acquired by the A-BGF network element from a media stream sent by the user equipment, and instructing the PCRF network element to update the source address information required for performing the QoS resource reservation to the third IP address and the third port, so that the PCRF network element performs the QoS resource reservation according to the updated source address information.

Another objective of the embodiments of the present invention is to provide a method for guaranteeing QoS of a communication service in a NAT scenario, where the method is applicable to an A-BGF network element, and the A-BGF network element is connected to a P-CSCF network element, and the method includes:

generating proxy SDP information according to calling party SDP information that is originated from a user equipment and forwarded by the P-CSCF network element, and returning the proxy SDP information to the P-CSCF network element, so that the P-CSCF network element replaces the calling party SDP information with the proxy SDP information to establish a connection between the user equipment and a called party, and instructs a PCRF network element to perform QoS resource reservation after the connection is successfully established, where the calling party SDP information includes a first IP address and a first port of the user equipment, the proxy SDP information includes a second IP address and a second port of the A-BGF network element, source address information required for performing the QoS resource reservation includes the first IP address and the first port, and destination address information required for performing the QoS resource reservation includes the second IP address and the second port; and receiving a third IP address and a third port of the user equipment, where the third IP address and the third port area result of NAT translation and acquired from a media stream sent by the user equipment, and sending the third IP address and the third port to the P-CSCF network element, so that the P-CSCF instructs the PCRF network element to update the source address information required for performing the QoS resource reservation to the third IP address and the third port, and then the PCRF network element performs the QoS resource reservation according to the updated source address information.

Another objective of the embodiments of the present invention is to provide an apparatus for guaranteeing QoS of a communication service in a NAT scenario, and the apparatus includes:

a communication establishing module, configured to receive calling party SDP information sent by a user equipment so that an A-BGF network element generates proxy SDP information according to the calling party SDP information, and replacing the calling party SDP information with the proxy SDP information to establish a connection between the user equipment and a called party, where the calling party SDP information includes a first IP address and a first port of the user equipment, and the proxy SDP information includes a second IP address and a second port of the A-BGF network element;

a QoS resource reservation instructing module, configured to: after the connection between the user equipment and the called party is successfully established, instruct the PCRF network element to perform QoS resource reservation, where source address information required for performing the QoS resource reservation includes the first IP address and the first port, and destination address information required for performing the QoS resource reservation includes the second IP address and the second port; and a QoS resource reservation updating module, configured to receive a third IP address and a third port of the user equipment, where the third IP address and the third port are a result of NAT translation and acquired by the A-BGF network element from a media stream sent by the user equipment, and instruct the PCRF network element to update the source address information required for performing the QoS resource reservation to the third IP address and the third port, so that the PCRF network element performs the QoS resource reservation according to the updated source address information.

Another objective of the embodiments of the present invention is to provide an apparatus for guaranteeing QoS of a communication service in a NAT scenario, and the apparatus includes:

a proxy module, configured to generate proxy SDP information according to calling party SDP information that is originated from a user equipment and forwarded by the P-CSCF network element, and return the proxy SDP information to the P-CSCF network element, so that the P-CSCF network element replaces the calling party SDP information with the proxy SDP information to establish a connection between the user equipment and a called party, and instructs a PCRF network element to perform QoS resource reservation after the connection is successfully established, where the calling party SDP information includes a first IP address and a first port of the user equipment, the proxy SDP information includes a second IP address and a second port of the A-BGF network element, source address information required for performing the QoS resource reservation includes the first IP address and the first port, and destination address information required for performing the QoS resource reservation includes the second IP address and the second port; and a NAT translated address acquiring module, configured to receive a third IP address and a third port of the user equipment, where the third IP address and the third port are a result of NAT translation and acquired from a media stream sent by the user equipment, and send the third IP address and the third port to the P-CSCF network element, so that the P-CSCF instructs the PCRF network element to update the source address information required for performing the QoS resource reservation to the third IP address and the third port, and then the PCRF network element performs the QoS resource reservation according to the updated source address information.

Another objective of the embodiments of the present invention is to provide a system for guaranteeing QoS of a communication service in a NAT scenario, and the system includes a P-CSCF network element, a PCRF network element, and an A-BGF network element, where the P-CSCF network element is connected to the A-BGF network element and the PCRF network element;

the P-CSCF network element receives calling party SDP information sent by a user equipment so that the A-BGF network element generates proxy SDP information according to the calling party SDP information, and replacing the calling party SDP information with the proxy SDP information to establish a connection between the user equipment and a called party, where the calling party SDP information includes a first IP address and a first port of the user equipment, and the proxy SDP information includes a second IP address and a second port of the A-BGF network element;

after the connection between the user equipment and the called party is successfully established, the P-CSCF network element instructs the PCRF network element to perform QoS resource reservation, where source address information required for performing the QoS resource reservation includes the first IP address and the first port, and destination address information required for performing the QoS resource reservation includes the second IP address and the second port; and the P-CSCF network element receives a third IP address and a third port of the user equipment, where the third IP address and the third port are a result of NAT translation and acquired by the A-BGF network element from a media stream sent by the user equipment, and instructs the PCRF network element to update the source address information required for performing the QoS resource reservation to the third IP address and the third port, so that the PCRF network element performs the QoS resource reservation according to the updated source address information.

According to the embodiments of the present invention, an A-BGF network element is controlled to generate, according to calling party SDP information, proxy SDP information that replaces the calling party SDP information to establish a connection between a user equipment and a called party, and QoS resource reservation from the user equipment to the A-BGF network element is performed; and meanwhile, after an NAT-translated-to IP address and a port of the user equipment are received, an upper-layer network element (PCSCF/PCRF) is instructed to update source address information for the QoS resource reservation. In this way, without imposing any special interface requirement on the user equipment, QoS guarantee for a communication service in a NAT scenario is achieved.

DETAILED DESCRIPTION

To make the objectives, technical solutions, and advantages of the present invention more clearly, the following further describes the present invention in detail with reference to the accompanying drawings and embodiments. It should be understood that the specific embodiments described herein are merely intended for illustrating the present invention, but are not intended to limit the present invention.

Figure 1:
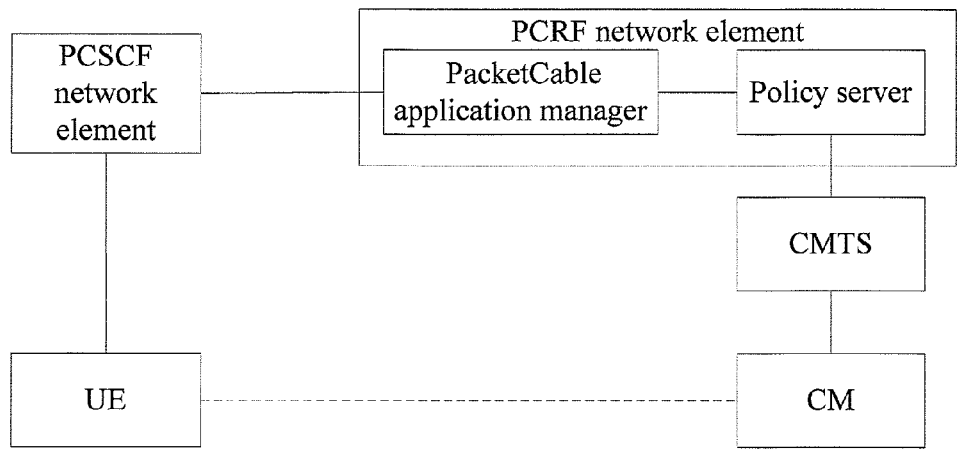
FIG. 1 is a structural diagram of the PacketCable2.0 architecture in a NAT scenario according to the prior art.

The embodiments of the present invention are based on the PacketCable2.0 architecture shown in FIG. 1. In a case in which the architecture is applied in a NAT scenario, an access-border gateway function (access-border gateway function, A-BGF) network element is introduced to connect to a proxy-call session control function (proxy-call session control function, P-CSCF) network element, so as to implement NAT traversal for a signaling stream and a media stream during a communication process and further achieve QoS guarantee of a communication service in the NAT scenario.

Figure 2:
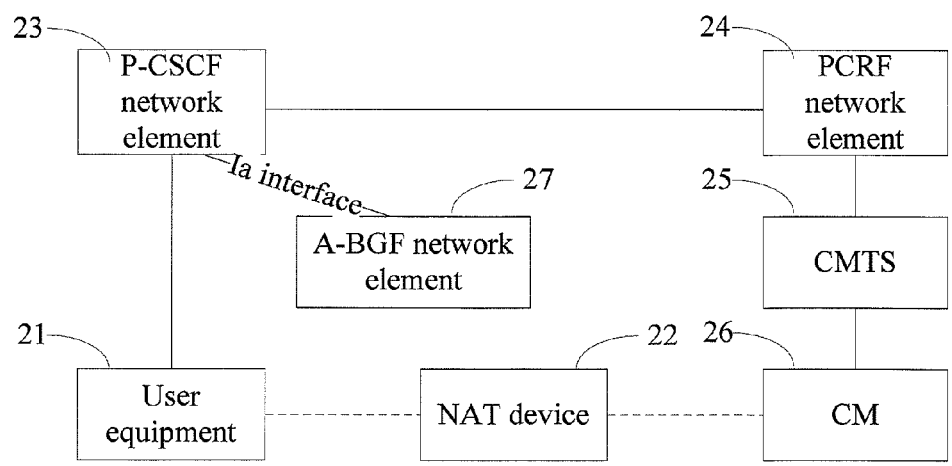
FIG. 2 is a structural diagram of a system for guaranteeing QoS of a communication service in a NAT scenario according to an embodiment of the present invention.

FIG. 2 shows a system for guaranteeing QoS of a communication service in a NAT scenario according to an embodiment of the present invention. For ease of description, only parts related to this embodiment of the present invention are illustrated.

Referring to FIG. 2, the system includes a user equipment (user equipment, UE) 21, a NAT device 22, a P-CSCF network element 23, a policy and charging rules function (policy and charging rules function, PCRF) network element 24, a cable modem terminal system (cable modem terminal systems, CMTS) 25, a cable modem (cable modem, CM) 26, and an A-BGF network element 27, where the A-BGF network element 27 is connected to the P-CSCF network element 23 through an Ia interface. Other parts in this architecture are consistent with those in the existing PacketCable2.0 architecture used in a NAT scenario. Reference may be made to the PacketCable2.0 standard for details, which are not further described here.

In this embodiment, the A-BGF network element 27 is introduced to provide a media proxy function for the user equipment 21. When media proxy is performed for the user equipment 21, the P-CSCF network element 23 controls the A-BGF network element 27 to generate proxy SDP information according to calling party Session Description Protocol (Session Description Protocol, SDP) information carried when the user equipment 21 initiates a communication request, and the P-CSCF network element 23 uses the proxy SDP information to send a corresponding signaling stream and a media stream to a called party. In this embodiment, the SDP is a Session Description Protocol of a communication entity to which the SDP belongs, and carries information about the communication entity to which the SDP belongs, such as an IP address, a port, and encoding capability. Therefore, the calling party SDP information carried when the user equipment 21 initiates the communication request includes the IP address and port of the user equipment 21, whereas the proxy SDP information generated by the A-BGF network element 27 according to the calling party SDP information includes an IP address and a port for downlink transmission of the A-BGF network element 27.

In this embodiment, the A-BGF network element 27 provides the media proxy function for the user equipment 21. The user equipment 21 communicates with other terminals in the name of the A-BGF network element 27. Therefore, on the calling party side, the CMTS 25 needs to perform QoS resource reservation from the user equipment 21 (a source address and a source port) to the A-BGF network element 27 (a destination address and a destination port) for a media stream sent by the user equipment 21, that is, use an IP address and a port provided in the proxy SDP information as the destination IP address and destination port for the QoS resource reservation, so as to implement the QoS resource reservation from the user equipment 21 to the A-BGF network element 27. Meanwhile, because the media stream sent by the calling party side experiences NAT translation after a session connection between both communication parties is established by means of signaling, but the source IP address and source port used by the CMTS 25 for the QoS resource reservation are the IP address and port (before NAT translation) of the user equipment 21 on the private network side, the A-BGF network element 27 needs to acquire the IP address and port after NAT translation) of the user equipment 21 from an IP header in the first media packet at this time, so that the CMTS 25 updates the source IP address and source port for the QoS resource reservation. In this way, this embodiment resolves a problem about QoS guarantee of a communication service in a NAT scenario.

Figure 3:
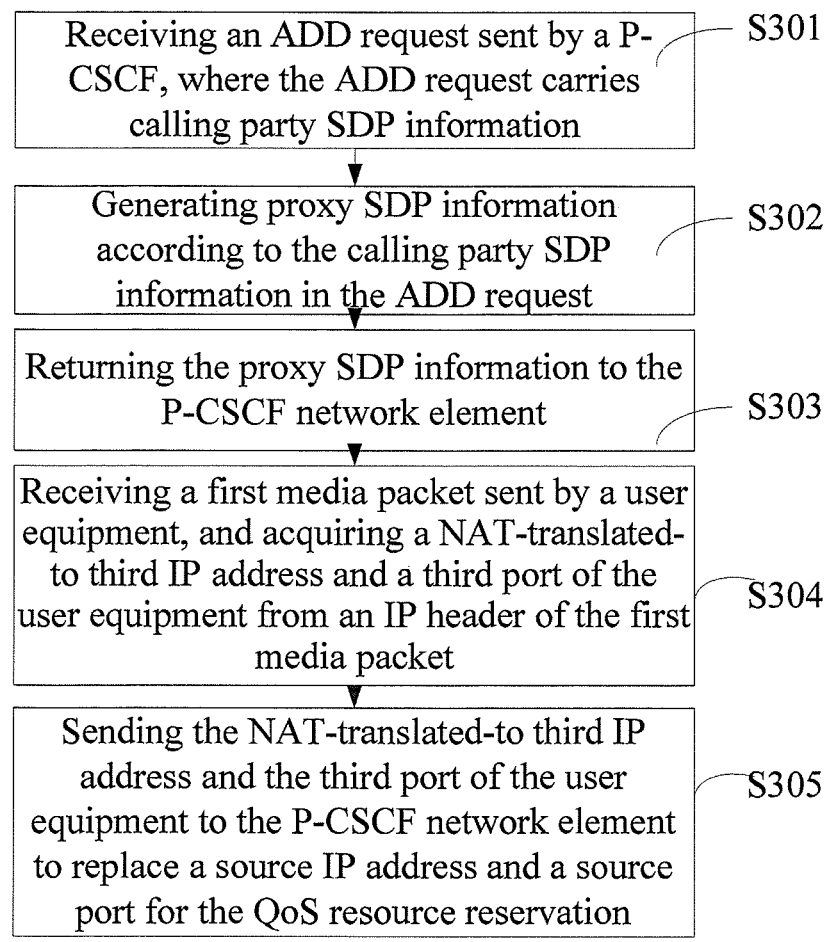
FIG. 3 is a flowchart of a method for NAT traversal of a communication service in a NAT scenario according to an embodiment of the present invention.

FIG. 3 is a flowchart of a method for guaranteeing QoS of a communication service in a NAT scenario according to an embodiment of the present invention. This embodiment is executed by an A-BGF network element. A specific process is described in detail as follows:

In step S301, an ADD request sent by a P-CSCF is received, where the ADD request carries calling party SDP information; and the calling party SDP information is acquired by the P-CSCF network element from a communication request initiated by a user equipment, and an IP address and a port included in the calling party SDP information are a first IP address and a first port of the user equipment on the private network side.

In step S302, proxy SDP information is generated according to the calling party SDP information in the ADD request;

and an IP address and a port included in the proxy SDP information are a second IP address and a second port of the A-BGF network element.

In step S303, the proxy SDP information is returned to the P-CSCF network element. In this embodiment, after the P-CSCF network element receives the proxy SDP information, the first IP address and the second port in the calling party SDP information are used as a source IP address and a source port, and the second IP address and the second port in the proxy SDP information are used as a destination IP address and a destination port, so as to perform QoS resource reservation.

In step S304, a first media packet sent by the user equipment is received; and a third IP address and a third port (that is, an IP address and a port of the user equipment on the public network side) of the user equipment, where the third IP address and the third port are a result of NAT translation, are acquired from an IP header of the first media packet.

In this embodiment, after the P-CSCF network element connects a call to the called party in the communication by using the proxy SDP information, the A-BGF network element acquires the NAT-translated-to IP address and port of the user equipment from the first media packet sent by the user equipment that functions as a calling party. The IP address and port after the NAT translation are a public network IP address and public network port of the user equipment, wherein the public network IP address and the public network port are a result of NAT translation performed by a NAT device.

In step S305, the NAT-translated-to third IP address and third port of the user equipment are sent to the P-CSCF network element to replace the original source IP address and source port for the QoS resource reservation.

In this embodiment, the P-CSCF uses the IP address and port of the user equipment as the source address and source port for the QoS resource reservation, where the IP address and the port are a result of NAT translation and acquired from the A-BGF network element. In this way, the CMTS 25 updates the source address and source port for the QoS resource reservation.

In this embodiment, a specific policy for the QoS resource reservation is determined according to a media type carried in the calling party SDP information.

Figure 4:
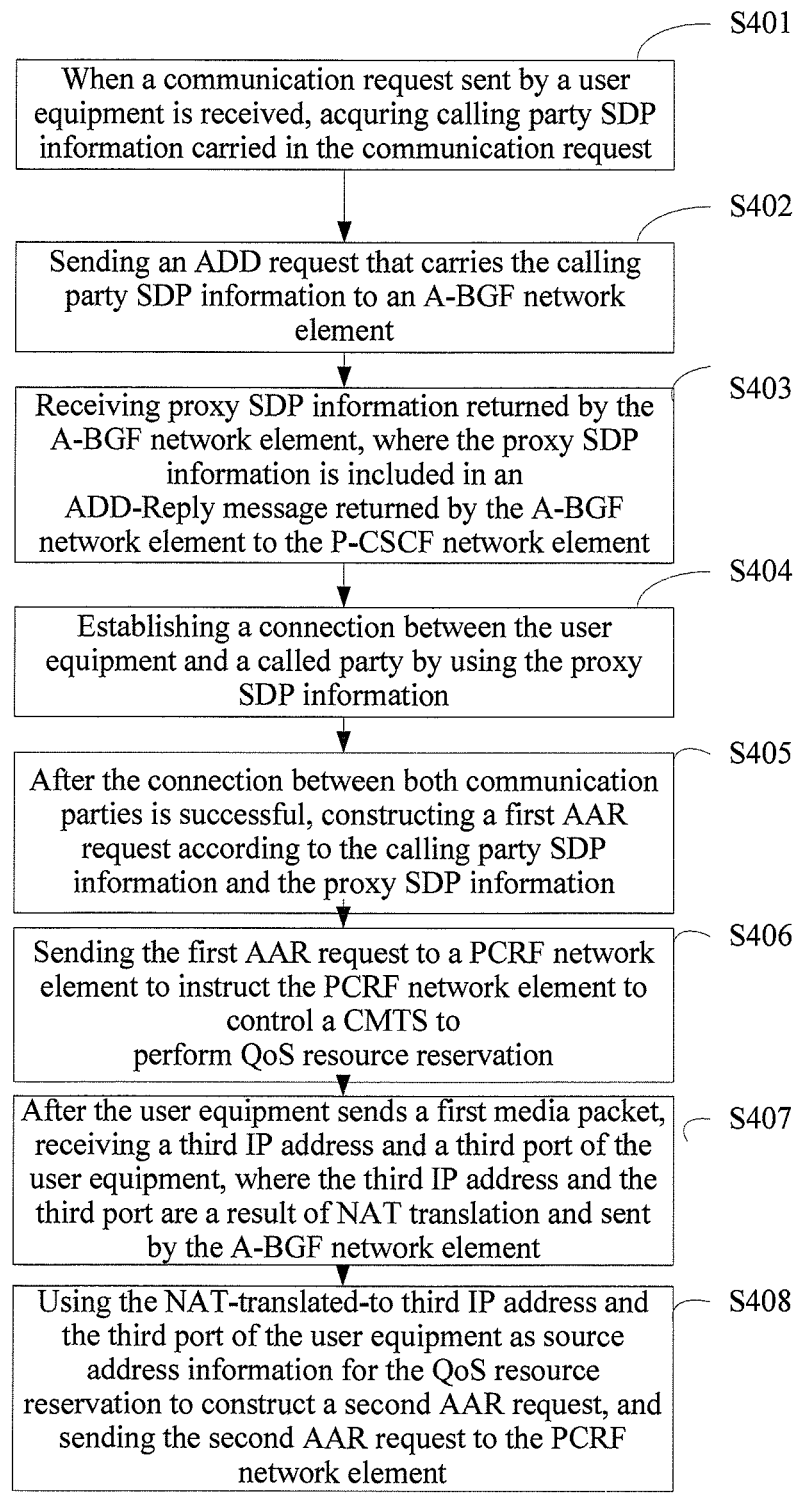
FIG. 4 is a flowchart of a method for guaranteeing QoS of a communication service in a NAT scenario according to an embodiment of the present invention.

FIG. 4 is a flowchart of a method for guaranteeing QoS of a communication service in a NAT scenario according to an embodiment of the present invention. This embodiment is executed by a P-CSCF network element. A specific implementation process is described in detail as follows:

In step S401, when a communication request sent by a user equipment is received, calling party SDP information carried in the communication request is acquired, where the calling party SDP information includes a first IP address and a first port of the user equipment on a private network side.

In step S402, an ADD request that carries the calling party SDP information is sent to an A-BGF network element.

In this embodiment, the ADD request that carries the calling party SDP information is sent to the A-BGF network element to initiate a media proxy request to the A-BGF network element and request the A-BGF network element to perform media proxy for the user equipment that functions as the calling party.

In step S403, proxy SDP information returned by the A-BGF network element is received, where the proxy SDP information is included in an ADD-Reply message returned by the A-BGF network element to the P-CSCF network element, and the proxy SDP information includes a second IP address and a second port of the A-BGF network element.

In step S404, a connection between the user equipment and a called party is established by using the proxy SDP information.

Specifically, a VOIP voice communication service is used as an example. In this embodiment, firstly, the P-CSCF network element sends an INVITE message that carries the proxy SDP information to the called party, to request establishing communication with the called party. Then, after receiving a 180 Ringing message from the called party, the P-CSCF network element forwards the 180 Ringing message to the user equipment, so that a ring back tone is played to the user equipment. If the P-CSCF network element receives a 200 OK message from a requested communication party, the communication request is successful and a connection between both communication parties is established.

It should be noted that, after the connection between both communication parties is established, because the called party also returns called party SDP information to the P-CSCF network element, the P-CSCF network element also sends an ADD request that carries the called party SDP information to the A-BGF network element at this time, and correspondingly, the A-BGF network element generates called party's media proxy SDP information, according to the called party SDP information, and returns the called party's media proxy SDP information to the P-CSCF network element in an ADD-Reply message. In this embodiment, the called party's media proxy SDP information generated by the A-BGF network element includes a fourth IP address and a fourth port of the A-BGF network element. Meanwhile, in the foregoing case, when the called party also enables media proxy, the called party returns media proxy SDP information on the called party side to the P-CSCF network element.

In step S405, after the connection between both communication parties is successful, the P-CSCF network element constructs a first AAR request according to the calling party SDP information and the proxy SDP information, where the AAR request describes source address information (that is, the first IP address and the first port of the user equipment included in the calling party SDP information) and destination address information (that is, the second IP address and the second port of the A-BGF network element included in the proxy SDP information) required for performing QoS resource reservation.

In step S406, the first AAR request is sent to a PCRF network element to instruct the PCRF network element to control a CMTS to perform the QoS resource reservation.

In this embodiment, after the PCRF network element receives the first AAR request, the PCRF network element delivers, according to the source address information and destination address information for the QoS resource reservation carried in the first AAR request, an open gate policy by sending a first GateSet message to the CMTS, and the CMTS controls a CM on the user equipment side that functions as the calling party to perform the QoS resource reservation from the user equipment to the A-BGF network element. In this case, the source IP address and source port for the QoS resource reservation are the first IP address and the first port of the user equipment on the private network side, and the destination IP address and destination port for the QoS resource reservation are the second IP address and the second port of the A-BGF network element.

As an embodiment of the present invention, after the QoS resource reservation by the CMTS is successful, the CMTS sends a first GateSetACK message to the PCRF network element. After receiving the first GateSetACK message, the PCRF network element sends a corresponding first Diameter AAA message to the P-CSCF network element to inform the P-CSCF network element that the QoS resource reservation is successful.

In this embodiment, after the QoS resource reservation is successful, the P-CSCF network element sends to the user equipment a 200 OK message indicating that the call is answered. After the user equipment sends an ACK message to the P-CSCF network element, both communication parties may start media stream transmission in the communication process.

In step S407, after the user equipment sends a first media packet, the P-CSCF network element receives a third IP address and a third port of the user equipment from the A-BGF network element, where the third IP address and the third port are a result of NAT translation and acquired by the A-BGF network element from an IP header of the first media packet sent by the user equipment.

In step S408, the NAT-translated-to third IP address and the third port of the user equipment are used as the source address information for the QoS resource reservation to construct a second AAR request; and the second AAR request is sent to the PCRF network element to request an update to the source address information for the QoS resource reservation.

In this embodiment, after receiving the second AAR request, the PCRF network element updates the source address information for the QoS resource reservation correspondingly, and updates the original first IP address and the first port of the user equipment on the private network side to the NAT-translated-to third IP address and the third port of the user equipment on the public network side. Eventually, the QoS resource reservation from the user equipment to the A-BGF network element is achieved, and QoS guarantee of a communication service is achieved in the communication process between the user equipment and a requested party.

Unlike the prior art, QoS guarantee of a communication service in a NAT scenario achieved by using the foregoing method does not impose any interface requirement on a user equipment, so that the QoS guarantee solution is not limited to the user equipment. Meanwhile, it should be noted that, the foregoing solution is also applicable when a NAT device is not involved in user equipment access, and it is only necessary to have the P-CSCF network element determine whether a NAT device exists when the user equipment initiates a communication request. If the NAT device exists, the P-CSCF controls the A-BGF network element to complete media proxy for the user equipment. If the NAT device does not exist, the P-CSCF directly controls a related device to directly perform QoS guarantee. The specific solution is not further described here.

Figure 5:
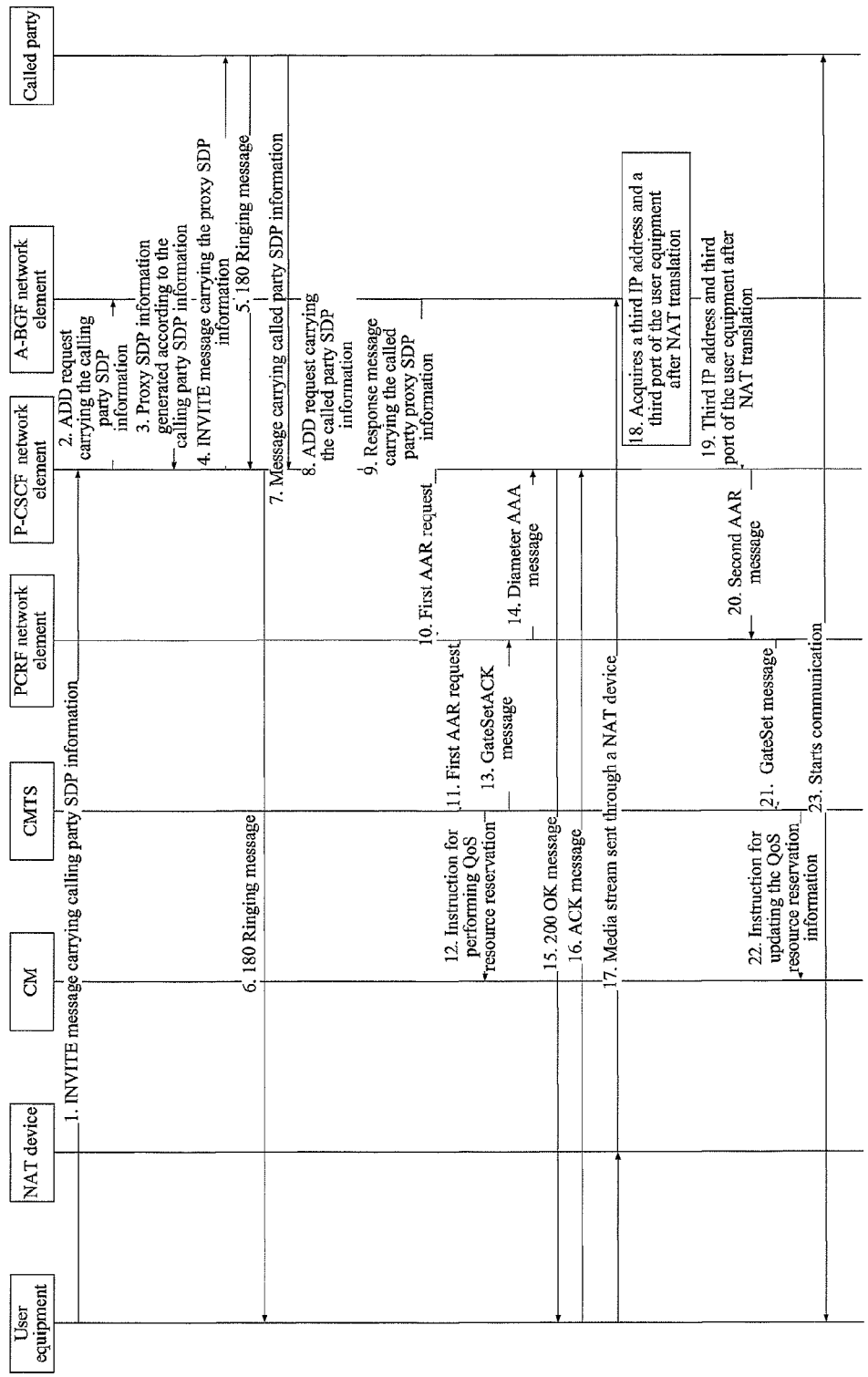
FIG. 5 is a flowchart of interaction according to a method for guaranteeing QoS of a communication service in a NAT scenario according to an embodiment of the present invention.

FIG. 5 is a flowchart of interaction during QoS guarantee of a communication service in a NAT scenario according to an embodiment of the present invention. The interaction is described in detail as follows:

1. A user equipment sends an INVITE message that carries calling party SDP information to a P-CSCF network element, so as to initiate a communication request, where the calling party SDP information includes a first IP address and a first port of the user equipment on the private network side.

2. The P-CSCF network element sends an ADD request that carries the calling party SDP information to an A-BGF network element, so as to instruct the A-BGF network element to perform media proxy for the user equipment.

3. The A-BGF network element returns proxy SDP information generated according to the calling party SDP information to the P-CSCF network element, where the proxy SDP information includes an IP address and a port for downlink transmission of the A-BGF network element.

4. The P-CSCF network element sends an INVITE message that carries the proxy SDP information to a called party, to request establishing a communication connection with the called party.

5. The called party sends a 180 Ringing message to the P-CSCF network element.

6. The P-CSCF network element forwards the 180 Ringing message to the user equipment, so that a ring back tone from the called party is played to the user equipment.

7. The called party sends a message that carries called party SDP information to the P-CSCF network element, indicating that the communication connection request is successful, where an IP address and a port in the called party SDP information are the IP address and port of the called party.

It should be noted that, when the requested communication party also uses the A-BGF network element to perform media proxy, the returned information is media proxy SDP information corresponding to the peer A-BGF network element.

8. The P-CSCF network element sends an ADD request that carries the called party SDP information to the A-BGF network element.

9. The A-BGF network element sends a response message that carries the called party's proxy SDP information to the P-CSCF network element, where an IP address and a port in the called party's proxy SDP information are a fourth IP address and a fourth port of the A-BGF network element.

10. The P-CSCF network element sends a first AAR request to the PCRF network element, where the first AAR request includes source address information (that is, the first IP address and the first port in the calling party SDP information) and destination address information (that is, the second IP address and the second port in the proxy SDP information) required for performing the QoS resource reservation.

11. The PCRF network element sends, according to the first AAR message sent by the P-CSCF network element, a GateSet message to a CMTS, so as to deliver an open gate policy to the CMTS.

12. The CMTS controls a CM to perform the QoS resource reservation from the user equipment to the A-BGF network element.

13. After the QoS resource reservation is successful, the CMTS returns a GateSetACK message to the PCRF network element.

14. The PCRF network element sends a Diameter AAA message to the P-CSCF network element, so as to inform the P-CSCF network element that QoS resource application and reservation are successful.

15. The P-CSCF network element sends to the user equipment a 200 OK message indicating that the call is answered by the requested community party in the communication.

16. The user equipment returns a corresponding ACK message to the P-CSCF network element. At this time, both parties may start to send and receive a media stream.

17. The user equipment sends a media stream to the A-BGF network element through a NAT device.

18. The A-BGF network element acquires the NAT-translated-to IP address and the port of the user equipment from an IP header of a first media packet, where the NAT-translated-to IP address and the port are an IP address and a port of the user equipment on the public network side after NAT translation.

19. The A-BGF network element sends the NAT-translated-to IP address and the port of the user equipment to the P-CSCF network element in a NOTIFY message.

20. The P-CSCF network element sends a second AAR message to the PCRF network element, where in the second AAR message, the NAT-translated-to third IP address and the third port of the user equipment are used as the source address information for the QoS resource reservation, so that the PCRF network element updates the source address information for the QoS resource reservation.

21. The PCRF network element sends a GateSet message to the CMTS to update the QoS resource reservation information.

22. The CMTS controls the CM to update the QoS resource reservation information.

23. The user equipment and the called party start communication.

Figure 6:
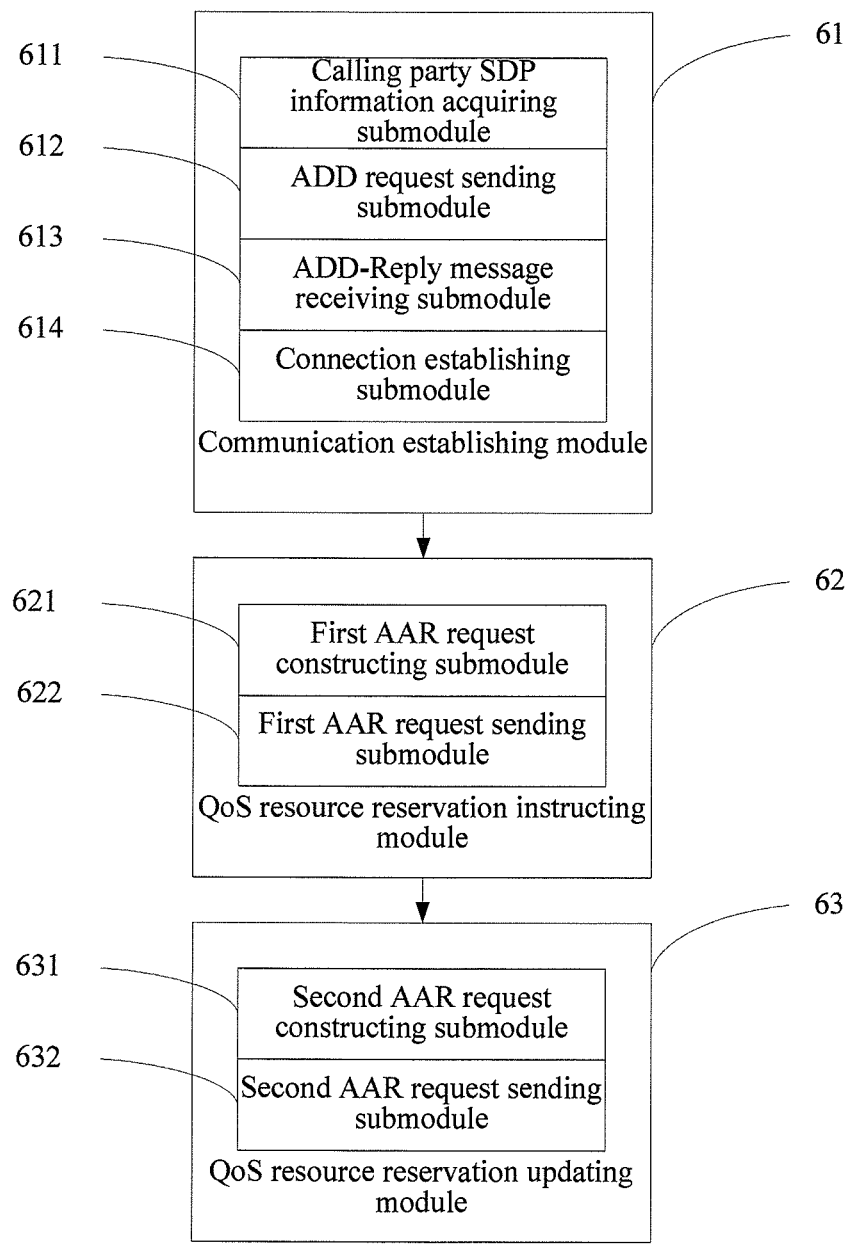
FIG. 6 is a structural diagram of an apparatus for guaranteeing QoS of a communication service in a NAT scenario according to an embodiment of the present invention.
Figure 7:
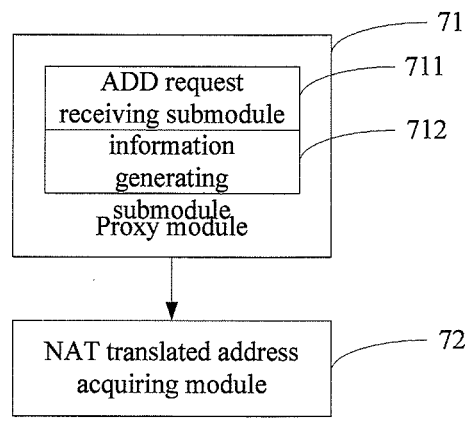
FIG. 7 is a structural diagram of an apparatus for guaranteeing QoS of a communication service in a NAT scenario according to an embodiment of the present invention.

FIG. 6 and FIG. 7 separately show a structure of an apparatus for guaranteeing QoS of a communication service in a NAT scenario according to embodiments of the present invention. For ease of description, only parts related to the embodiments of the present invention are illustrated.

As shown in FIG. 6, the apparatus for guaranteeing QoS runs on a P-CSCF network element in a system for guaranteeing QoS of a communication service in a NAT scenario, specifically including:

a communication establishing module 61, configured to receive calling party SDP information sent by a user equipment so that an A-BGF network element generates proxy SDP information according to the calling party SDP information, and replacing the calling party SDP information with the proxy SDP information to establish a connection between the user equipment and a called party, where the calling party SDP information includes a first IP address and a first port of the user equipment, and the proxy SDP information includes a second IP address and a second port of the A-BGF network element;

a QoS resource reservation instructing module 62, configured to: after the connection between the user equipment and the called party is successfully established, instruct a PCRF network element to perform QoS resource reservation, where source address information required for performing the QoS resource reservation includes the first IP address and the first port, and destination address information required for performing the QoS resource reservation includes the second IP address and the second port; and a QoS resource reservation updating module 63, configured to receive a third IP address and a third port of the user equipment, where the third IP address and the third port are a result of NAT translation and acquired by the A-BGF network element from a media stream sent by the user equipment, and instruct the PCRF network element to update the source address information required for performing the QoS resource reservation to the third IP address and the third port, so that the PCRF network element performs the QoS resource reservation according to the updated source address information.

The communication establishing module 61 specifically includes:

a calling party SDP information acquiring submodule 611, configured to acquire the calling party SDP information from a communication request of the user equipment;

an ADD request sending submodule 612, configured to send an ADD request that carries the calling party SDP information to the A-BGF network element;

an ADD-Reply message receiving submodule 613, configured to receive an ADD-Reply message returned by the A-BGF network element, where the ADD-Reply message carries the proxy SDP information generated by the A-BGF network element according to the calling party SDP information; and a connection establishing submodule 614, configured to establish a connection between the user equipment and the called party by using the proxy SDP information.

The QoS resource reservation instructing module 62 specifically includes:

a first AAR request constructing submodule 621, configured to construct a first AAR request, where the first AAR request carries the calling party SDP information that is used as a source of the source address information and the proxy SDP information that is used as a source of the destination address information; and a first AAR request sending submodule 622, configured to send the first AAR request to the PCRF network element, so that the PCRF network element determines, according to the first AAR request, a policy for the QoS resource reservation, and delivers the policy to a CMTS to perform the QoS resource reservation.

The QoS resource reservation updating module 63 specifically includes:

a second AAR request constructing submodule 631, configured to construct a second AAR request, where the source address information required for performing the QoS resource reservation in the second AAR request is updated to the third IP address and the third port; and a second AAR request sending submodule 632, configured to send the second AAR request to the PCRF network element, so that the PCRF network element updates, according to the second AAR request, the policy for the QoS resource reservation, and delivers the updated policy to a CMTS to perform the QoS resource reservation.

As shown in FIG. 7, the apparatus for guaranteeing QoS runs on an A-BGF network element in a system for guaranteeing QoS of a communication service in a NAT scenario, specifically including:

a proxy module 71, configured to generate proxy SDP information according to calling party SDP information that is originated from a user equipment and forwarded by the P-CSCF network element, and return the proxy SDP information to the P-CSCF network element, so that the P-CSCF network element replaces the calling party SDP information with the proxy SDP information to establish a connection between the user equipment and a called party, and instructs a PCRF network element to perform QoS resource reservation after the connection is successfully established, where the calling party SDP information includes a first IP address and a first port of the user equipment, the proxy SDP information includes a second IP address and a second port of the A-BGF network element, source address information required for performing the QoS resource reservation includes the first IP address and the first port, and destination address information required for performing the QoS resource reservation includes the second IP address and the second port; and a NAT translated address acquiring module 72, configured to receive a third IP address and a third port of the user equipment, where the third IP address and the third port are a result of NAT translation and acquired from a media stream sent by the user equipment, and send the third IP address and the third port to the P-CSCF network element, so that the P-CSCF instructs the PCRF network element to update the source address information required for performing the QoS resource reservation to the third IP address and the third port, and then the PCRF network element performs the QoS resource reservation according to the updated source address information.

The proxy module 71 specifically includes:

an ADD request receiving submodule 711, configured to receive an ADD request sent by the P-CSCF network element, where the ADD request carries the calling party SDP information;

a proxy SDP information generating submodule 712, configured to generate the proxy SDP information according to the calling party SDP information; and an ADD-Reply message returning submodule 713, configured to return an ADD-Reply message to the P-CSCF network element, where the ADD-Reply message carries the proxy SDP information.

Figure 8:
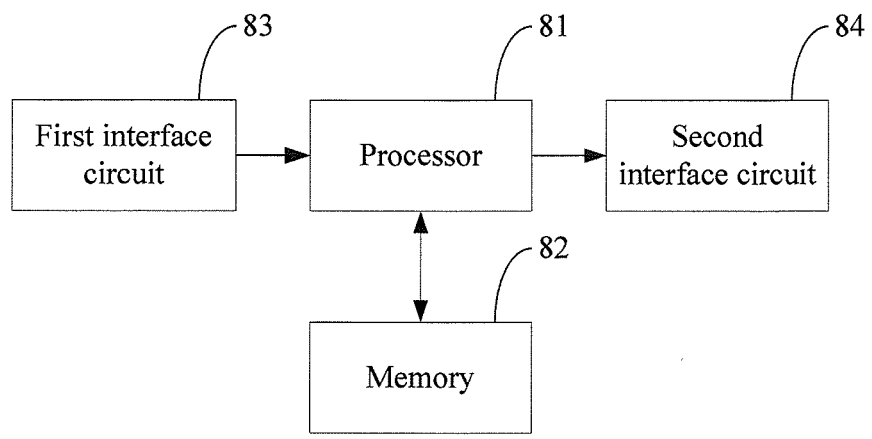
FIG. 8 is a structural diagram of hardware of an apparatus for guaranteeing QoS of a communication service in a NAT scenario according to an embodiment of the present invention.

The apparatuses shown in FIG. 6 and FIG. 7 are implemented based on the H.248 Media Gateway Control Protocol and may actually run on a hardware structure shown in FIG. 8. The hardware structure includes a processor 81, a memory 82, a first interface circuit 83, and a second interface circuit 84, where related data to be processed is input by the first interface circuit 83, the processor 81 is configured to invoke a related program from the memory 82 to implement each function of the apparatus based on the H.248 protocol, and meanwhile, the processed data is output by the second interface circuit 84.

The embodiments of the present invention are based on the PacketCable2.0 architecture shown in FIG. 1. In this architecture, in a NAT scenario, an A-BGF network element is introduced and is connected to a P-CSCF network element to perform media proxy for a user equipment in a communication process to complete NAT traversal of a signaling stream and a media stream, thereby further achieving QoS guarantee of a communication service in the NAT scenario.

The foregoing descriptions are merely exemplary embodiments of the present invention, but are not intended to limit the present invention. Any modifications, equivalent replacements, and improvements made within the spirit and principle of the present invention shall fall within the protection scope of the present invention.

What is claimed is:

1. A method for guaranteeing quality of service (QoS) of a communication service in a network address translation (NAT) scenario, wherein the method is applicable to a proxy call session control function (P-CSCF) network element connected to an access border gateway function (A-BGF) network element and a policy and charging rules function (PCRF) network element, and the method comprises:

receiving calling party Session Description Protocol (SDP) information sent by a user equipment so that the A-BGF network element generates proxy SDP information according to the calling party SDP information;

replacing the calling party SDP information with the proxy SDP information to establish a connection between the user equipment and a called party that is different from the A-BGF network element, wherein the calling party SDP information comprises a first IP address and a first port of the user equipment, and the proxy SDP information comprises a second IP address and a second port of the A-BGF network element;

after the connection between the user equipment and the called party is successfully established, instructing the PCRF network element to perform QoS resource reservation, wherein source address information required for performing the QoS resource reservation comprises the first IP address and the first port, and destination address information required for performing the QoS resource reservation comprises the second IP address and the second port;

receiving a third IP address and a third port of the user equipment, where the third IP address and the third port are a result of NAT translation and acquired by the A-BGF network element from a media stream sent by the user equipment; and instructing the PCRF network element to update the source address information required for performing the QoS resource reservation to the third IP address and the third port, so that the PCRF network element performs the QoS resource reservation according to the updated source address information.

2. The method according to claim 1, wherein receiving calling party SDP information sent by a user equipment so that the A-BGF network element generates proxy SDP information according to the calling party SDP information, and replacing the calling party SDP information with the proxy SDP information to establish a connection between the user equipment and a called party, comprises:

acquiring the calling party SDP information from a communication request of the user equipment;

sending an ADD request that carries the calling party SDP information to the A-BGF network element;

receiving an ADD-Reply message returned by the A-BGF network element, wherein the ADD-Reply message carries the proxy SDP information generated by the A-BGF network element according to the calling party SDP information; and establishing a connection between the user equipment and the called party by using the proxy SDP information.

3. The method according to claim 1, wherein instructing the PCRF network element to perform QoS resource reservation comprises:

constructing a first AAR request, wherein the first AAR request carries the calling party SDP information that is used as a source of the source address information and the proxy SDP information that is used as a source of the destination address information; and sending the first AAR request to the PCRF network element, so that the PCRF network element determines, according to the first AAR request, a policy for the QoS resource reservation, and delivers the policy to a cable modem terminal system (CMTS) to perform the QoS resource reservation.

4. The method according to claim 1, wherein instructing the PCRF network element to update the source address information required for performing the QoS resource reservation to the third IP address and the third port comprises:

constructing a second AAR request, wherein in the second AAR request, the source address information required for performing the QoS resource reservation is updated to the third IP address and the third port; and sending the second AAR request to the PCRF network element, so that the PCRF network element updates, according to the second AAR request, a policy for the QoS resource reservation, and delivers the updated policy to a cable modem terminal system (CMTS) to perform the QoS resource reservation.

5. A method for guaranteeing quality of service (QoS) of a communication service in a network address translation (NAT) scenario, wherein the method is applicable to an access border gateway function (A-BGF) network element connected to a proxy call session control function (P-CSCF) network element, and the method comprises:
  generating proxy Session Description Protocol (SDP) information according to calling party SDP information that is originated from a user equipment and forwarded by the P-CSCF network element, and returning the proxy SDP information to the P-CSCF network element, so that the P-CSCF network element replaces the calling party SDP information with the proxy SDP information to establish a connection between the user equipment and a called party that is different from the A-BGF network element, and instructs a policy and charging rules function (PCRF) network element to perform QoS resource reservation after the connection is successfully established, wherein the calling party SDP information comprises a first IP address and a first port of the user equipment, the proxy SDP information comprises a second IP address and a second port of the A-BGF network element, source address information required for performing the QoS resource reservation comprises the first IP address and the first port, and destination address information required for performing the QoS resource reservation comprises the second IP address and the second port;
  receiving a third IP address and a third port of the user equipment, where the third IP address and the third port are a result of NAT translation and acquired from a media stream sent by the user equipment; and
  sending the third IP address and the third port to the P-CSCF network element, so that the P-CSCF instructs the PCRF network element to update the source address information required for performing the QoS resource reservation to the third IP address and the third port, and then the PCRF network element performs the QoS resource reservation according to the updated source address information.

6. The method according to claim 5, wherein generating proxy SDP information according to calling party SDP information that is originated from a user equipment and forward by the P-CSCF network element, and returning the proxy SDP information to the P-CSCF network element, comprises:
  receiving an ADD request sent by the P-CSCF network element, wherein the ADD request carries the calling party SDP information;
  generating the proxy SDP information according to the calling party SDP information; and
  returning an ADD-Reply message to the P-CSCF network element, wherein the ADD-Reply message carries the proxy SDP information.

7. An apparatus for guaranteeing quality of service (QoS) of a communication service in a network address translation (NAT) scenario, wherein the apparatus comprises:
  a communication establishing module configured to receive calling party Session Description Protocol (SDP) information sent by a user equipment so that an access border gateway function (A-BGF) network element generates proxy SDP information according to the calling party SDP information, and replace the calling party SDP information with the proxy SDP information to establish a connection between the user equipment and a called party that is different from the A-BGF network element, wherein the calling party SDP information comprises a first IP address and a first port of the user equipment, and the proxy SDP information comprises a second IP address and a second port of the A-BGF network element;
  a QoS resource reservation instructing module configured to, after the connection between the user equipment and the called party is successfully established, instruct a policy and charging rules function (PCRF) network element to perform QoS resource reservation, wherein source address information required for performing the QoS resource reservation comprises the first IP address and the first port, and destination address information required for performing the QoS resource reservation comprises the second IP address and the second port; and
  a QoS resource reservation updating module configured to receive a third IP address and a third port of the user equipment, where the third IP address and the third port are a result of NAT translation and acquired by the A-BGF network element from a media stream sent by the user equipment, and instruct the PCRF network element to update the source address information required for performing the QoS resource reservation to the third IP address and the third port, so that the PCRF network element performs the QoS resource reservation according to the updated source address information.

8. The apparatus according to claim 7, wherein the communication establishing module comprises:
  a calling party SDP information acquiring submodule, configured to acquire the calling party SDP information from a communication request from the user equipment;
  an ADD request sending submodule, configured to send an ADD request that carries the calling party SDP information to the A-BGF network element;
  an ADD-Reply message receiving submodule, configured to receive an ADD-Reply message returned by the A-BGF network element, wherein the ADD-Reply message carries the proxy SDP information generated by the A-BGF network element according to the calling party SDP information; and
  a connection establishing submodule, configured to establish a connection between the user equipment and the called party by using the proxy SDP information.

9. The apparatus according to claim 7, wherein the QoS resource reservation instructing module comprises:
  a first AAR request constructing submodule, configured to construct a first AAR request, wherein the first AAR request carries the calling party SDP information that is used as a source of the source address information and the proxy SDP information that is used as a source of the destination address information; and
  a first AAR request sending submodule, configured to send the first AAR request to the PCRF network element, so that the PCRF network element determines, according to the first AAR request, a policy for the QoS resource reservation, and delivers the policy to a cable modem terminal system (CMTS) to perform the QoS resource reservation.

10. The apparatus according to claim 7, wherein the QoS resource reservation updating module comprises:
  a second AAR request constructing submodule, configured to construct a second AAR request, wherein in the second AAR request, the source address information required for performing the QoS resource reservation is updated to the third IP address and the third port; and
  a second AAR request sending submodule, configured to send the second AAR request to the PCRF network element, so that the PCRF network element updates, according to the second AAR request, a policy for the QoS resource reservation, and delivers the updated policy to a CMTS to perform the QoS resource reservation.

11. An apparatus for guaranteeing quality of service (QoS) of a communication service in a network address translation (NAT) scenario, wherein the apparatus comprises:
a proxy module configured to generate proxy Session Description Protocol (SDP) information according to calling party SDP information that is originated from a user equipment and forwarded by a proxy call session control function (P-CSCF) network element, and return the proxy SDP information to the P-CSCF network element, so that the P-CSCF network element replaces the calling party SDP information with the proxy SDP information to establish a connection between the user equipment and a called party, and instructs a policy and charging rules function (PCRF) network element to perform QoS resource reservation after the connection is successfully established, wherein the calling party SDP information comprises a first IP address and a first port of the user equipment, the proxy SDP information comprises a second IP address and a second port of an access border gateway function (A-BGF) network element that is different from the called party, source address information required for performing the QoS resource reservation comprises the first IP address and the first port, and destination address information required for performing the QoS resource reservation comprises the second IP address and the second port; and
a NAT translated address acquiring module configured to receive a third IP address and a third port of the user equipment, where the third IP address and the third port are a result of NAT translation and acquired from a media stream sent by the user equipment, and send the third IP address and the third port to the P-CSCF network element, so that the P-CSCF instructs the PCRF network element to update the source address information required for performing the QoS resource reservation to the third IP address and the third port, and then the PCRF network element performs the QoS resource reservation according to the updated source address information.

12. The apparatus according to claim 11, wherein the proxy module comprises:
an ADD request receiving submodule, configured to receive an ADD request sent by the P-CSCF network element, wherein the ADD request carries the calling party SDP information;
a proxy SDP generating submodule, configured to generate the proxy SDP information according to the calling party SDP information; and
an ADD-Reply message returning submodule, configured to return an ADD-Reply message to the P-CSCF network element, wherein the ADD-Reply message carries the proxy SDP information.

13. A system for guaranteeing quality of service (QoS) of a communication service in a network address translation (NAT) scenario, wherein the system comprises:
a proxy call session control function (P-CSCF) network element;
a policy and charging rules function (PCRF) network element; and
an access border gateway function (A-BGF) network element,
wherein the P-CSCF network element is connected to the A-BGF network element and the PCRF network element,
wherein the P-CSCF network element receives calling party Session Description Protocol (SDP) information sent by a user equipment so that the A-BGF network element generates proxy SDP information according to the calling party SDP information,
wherein the P-CSCF network element replaces the calling party SDP information with the proxy SDP information to establish a connection between the user equipment and a called party that is different from the A-BGF network element, wherein the calling party SDP information comprises a first IP address and a first port of the user equipment, and the proxy SDP information comprises a second IP address and a second port of the A-BGF network element,
wherein, after the connection between the user equipment and the called party is successfully established, the P-CSCF network element instructs the PCRF network element to perform QoS resource reservation, wherein source address information required for performing the QoS resource reservation comprises the first IP address and the first port, and destination address information required for performing the QoS resource reservation comprises the second IP address and the second port,
wherein the P-CSCF network element receives a third IP address and a third port of the user equipment, where the third IP address and the third port are a result of NAT translation and acquired by the A-BGF network element from a media stream sent by the user equipment, and
wherein the P-CSCF network element instructs the PCRF network element to update the source address information required for performing the QoS resource reservation to the third IP address and the third port, so that the PCRF network element performs the QoS resource reservation according to the updated source address information.

14. The method according to claim 1, wherein the connection between the user equipment and the called party is established by:
sending, from the P-CSCF to the called party, an invite message including the proxy SDP information;
receiving, at the P-CSCF from the called party, a ringing message;
forwarding, from the P-CSCF to the user equipment, the ringing message;
receiving, at the P-CSCF from the user equipment, an acknowledgement message; and
establishing the connection between the user equipment and the called party.

15. The method of claim 14, wherein, after the connection between the user equipment and the called party is established, the method further comprises receiving, at the P-CSCF from the A-BGF network element, media proxy SDP information of the called party that was generated by the A-BGF based on SDP information of the called party, wherein the media proxy SDP information of the called party includes a fourth IP address and a fourth port of the A-BGF network element.

* * * * *